UNITED STATES PATENT OFFICE.

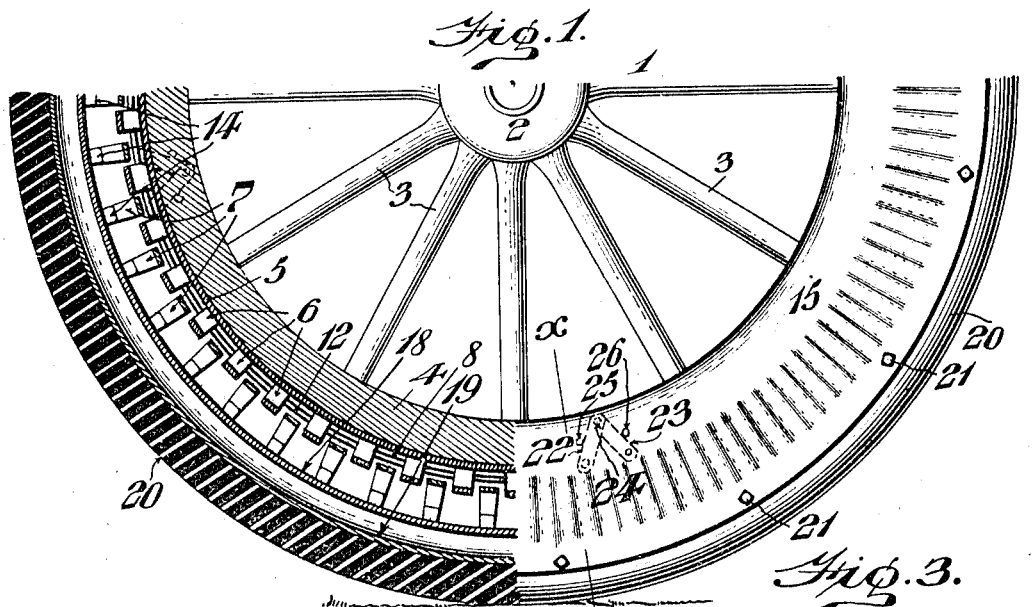
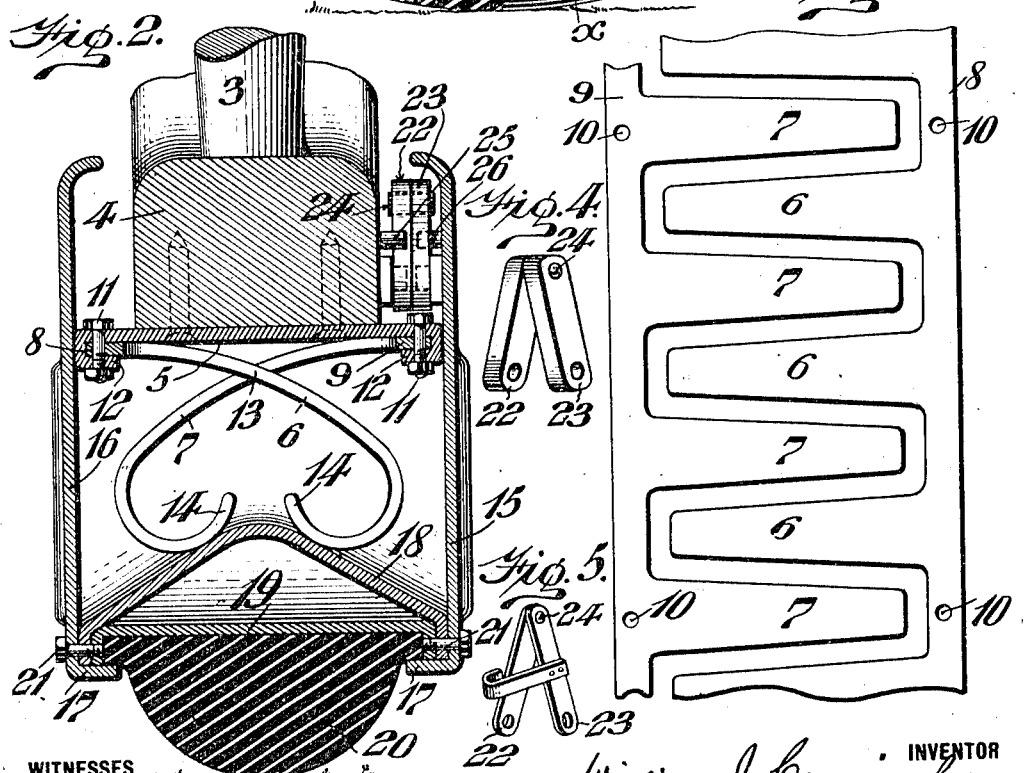

WILLIAM J. CUNNINGHAM, OF PHILADELPHIA, PENNSYLVANIA.

VEHICLE-TIRE.

1,012,331.

Specification of Letters Patent. Patented Dec. 19, 1911.

Application filed October 24, 1910. Serial No. 588,627.

*To all whom it may concern:*

Be it known that I, WILLIAM J. CUNNINGHAM, a citizen of the United States, residing in the city and county of Philadelphia, State of Pennsylvania, have invented a new and useful Vehicle-Tire, of which the following is a specification.

My invention relates to a new and useful vehicle tire and consists in providing a suitable tread movably supported and springs interposed between the tread support and the rim for providing resiliency.

It further consists of a novel construction and arrangement of springs, whereby suitable resiliency and strength are provided.

It further consists of other novel features, all as will be hereinafter fully set forth.

Figure 1 represents a partial side elevation and partial sectional view showing a portion of the wheel with my novel tire applied thereto. Fig. 2 represents a sectional view on line $x$—$x$, Fig. 1. Fig. 3 represents a plan view showing in flattened position, the springs employed and the relation of one series of springs with respect to the other. Fig. 4 represents a perspective view of pivoted arms employed. Fig. 5 represents a perspective view of a slightly different form of pivoted arms that may be employed.

Similar numerals of reference indicate corresponding parts in the figures.

Referring to the drawings:—In a vehicle tire it is necessary to provide a suitable amount of resiliency without detracting from the strength and it is further of advantage to provide a solid tread or one which cannot be punctured or easily injured. My invention is designed to accomplish these results and in the drawing I have shown one embodiment of my invention which is at present preferred by me, but it will be evident that the arrangement of the parts may be varied, other instrumentalities may be employed and changes may be made in the construction which will come within the scope of my invention and I do not, therefore, desire to be limited in every instance to the exact form as herein shown and described.

1 designates a portion of a vehicle wheel having a suitable hub 2 and spokes 3 suitably connected with the rim 4. Connected in any suitable manner with the rim is a plate 5. Connected in any suitable manner with the plate 5 are a series of springs 6 and 7 which I have shown in the present instance as formed of continuous bands 8 and 9 from which project at suitable intervals, the said springs 6 and 7, and as here shown, the said bands 8 and 9 are provided with suitable openings 10 through which pass bolts 11 which also pass through suitable openings in the plate 5 in order to secure the said springs to said plate. In the present instance, the plate 5 has its edges downwardly and forwardly turned, forming flanges 12, providing a space between the same and the plate 5 for the reception of the bands 8 and 9 and in this instance, the bolts 11 also pass through suitable openings in said flanges 12 so that the said springs 6 and 7 are firmly and properly attached to the plate 5.

As will be noted, the springs 6 and 7 curve outwardly away from the plate 5 and the adjacent springs cross each other at a suitable point, as at 13, and the ends of said springs are curved backwardly with their ends 14 pointing toward the plate 5, in such a manner that a suitable space is provided between the ends of the adjacent springs, since it will be understood that the band 8 is secured adjacent one edge of the plate 5 at the band 9 adjacent the other edge of the plate 5 so that the projecting springs 6 and 7 alternate with each other as will best be understood from Fig. 3. Movably supported with respect to the rim 4 and plate 5 is the support for the tread of the tire. In the present instance, this support or frame is formed of plates 15 and 16 the outer edges of which are inturned forming the shoulders 17. Suitably secured to the plates is a bearing member 18 the walls of which are inclined toward each other, thus forming an inwardly extending cone or wedge shape member and said plates having also connected therewith a plate 19 between which and the flanges 17 is secured a suitable portion of the tread 20 of the tire, this tread in the present instance being solid and formed of rubber, although it may be of any suitable material. The said bearing member 18 and plate 19 are secured to the plates 15 and 16 by the bolts 21. It will be noted that the said bearing member 18 abuts the curved end portion of the springs 6 and 7 with the apex of said bearing member situated at substantially the opening between the ends of the springs 6 and 7. It will thus be seen that I have provided a movable support for the tread 20 and I have supported the same upon the springs 6 and 7 in order that as the wheel rotates the weight bearing down upon the bearing member 18 at the lower portion of the wheel will tend to separate or spread the springs 6 and 7 apart and at the same time forcing the same in a direction toward the plate 5 thus providing an extremely resilient spring construction. It will, of course, be understood that the movement of the springs will be limited both by reason of the contact of a suitable portion thereof with the plate 5 or with a suitable portion of the curved ends abutting the inner wall of the plates 15 and 16.

In order to prevent creeping of the support with respect to the rim, I have here shown two arms 22 and 23 which are pivoted together at 24, one of said arms as 22, being pivotally connected with the rim 4, while the other arm 23 is pivotally connected with one of the plates of the supporting frame, here shown as the plate 15, while carried by the rim 4 is a pin 25 and carried by the plate 15 is a pin 26, so situated with respect to the arms 22 and 23, that radial movement is permitted but sidewise or lateral movement of these arms is prevented.

As seen in dotted lines in Figs. 1 and 2 the arms 22 and 23 can move downwardly when the weight is upon that portion of the wheel and the lower ends thereof can separate as will be evident, the said arms 22 and 23 being caused to resume their normal position after the weight is removed by reason of the position of the said pins 25 and 26.

In the construction shown in Fig. 3, I have shown the two arms 22 and 23 but in lieu of employing the pins 25 and 26 I have connected with one of the arms, as 23, a stop member which prevents the separation of the arms at a desired point and so limiting the movement with respect to each other.

Having thus described my invention, what I claim as new and desire to secure by Letters Patent, is:—

1. In a device of the character stated, a felly, a plurality of series of resilient non-elastic spring members, one series connected at one side of the felly and extending beyond the central plane thereof and the other series connected at the opposite side of the felly and extending beyond the central plane thereof, whereby the body portion of the members thereof cross each other and the free end of each member being curled inwardly and toward the body portion thereof, a wedge member resting upon the said free ends of the spring members and adapted to force said members apart, and a tread member connected with said wedge member, said spring members being unconfined excepting at their point of connection.

2. In a device of the character stated, a felly, a plate secured thereto and extending on each side of the felly, a plurality of series of resilient non-elastic springs, one series connected at one side of the plate and extending beyond the central plane thereof, and the other series connected at the opposite side of the plate and extending beyond the central plane thereof, whereby the body portion of the members thereof cross each other and the free end of each member being curled inwardly and toward the body portion thereof, a wedge member resting upon the said free ends of the spring members and adapted to force said members apart and a tread member connected with said wedge member, said spring members being unconfined excepting at their point of connection.

3. In a device of the character stated, a felly, a plurality of series of resilient, non-elastic springs, one series connected at one side of the felly and extending beyond the central plane thereof, and the other series connected at the opposite side of the felly and extending beyond the central plane thereof, whereby the body portions of the spring members cross each other and the end of each member being curled inwardly and toward the body portion thereof, a frame having sides and a wedge member, having inclined sides contacting respectively with the ends of said spring members and a tread member carried by said frame, said springs being adapted for unconfined movement and said frame serving as stops for said spring members.

WILLIAM J. CUNNINGHAM.

Witnesses:
C. D. McVay,
F. A. Newton.

---

Copies of this patent may be obtained for five cents each, by addressing the "Commissioner of Patents, Washington, D. C."